(12) United States Patent
Bounds et al.

(10) Patent No.: US 6,540,920 B2
(45) Date of Patent: Apr. 1, 2003

(54) WASTEWATER TREATMENT SYSTEM UTILIZING TEXTILE FILTER MEDIA

(75) Inventors: Terry R. Bounds, Roseburg, OR (US); Harold L. Ball, Roseburg, OR (US); Eric S. Ball, Roseburg, OR (US)

(73) Assignee: Orenco Systems, Inc., Sutherlin, OR (US)

( * ) Notice: Subject to any disclaimer, the term of this patent is extended or adjusted under 35 U.S.C. 154(b) by 0 days.

(21) Appl. No.: 09/789,400

(22) Filed: Feb. 20, 2001

(65) Prior Publication Data

US 2002/0153304 A1 Oct. 24, 2002

(51) Int. Cl.$^7$ ................................. C02F 3/04
(52) U.S. Cl. .................. 210/615; 210/620; 210/150; 210/532.2
(58) Field of Search ..................... 210/605, 615, 210/620, 630, 150, 151, 259, 532.2, 299

(56) References Cited

U.S. PATENT DOCUMENTS

| | | | |
|---|---|---|---|
| 3,231,490 A | * | 1/1966 | Fry ............................ 210/150 |
| 3,301,401 A | | 1/1967 | Hall |
| 3,617,541 A | * | 11/1971 | Pan ............................ 210/150 |
| 4,439,323 A | | 3/1984 | Ball |
| 5,397,474 A | * | 3/1995 | Henry ........................ 210/615 |
| 5,480,561 A | | 1/1996 | Ball et al. |
| 5,492,635 A | | 2/1996 | Ball |
| 5,531,894 A | | 7/1996 | Ball et al. |
| 5,585,266 A | * | 12/1996 | Plitt et al. .................. 210/615 |
| 5,980,748 A | | 11/1999 | Auger et al. |
| 6,274,035 B1 | * | 8/2001 | Yuan et al. ................. 210/150 |

FOREIGN PATENT DOCUMENTS

| | | | |
|---|---|---|---|
| FR | 2269498 | * | 11/1975 |
| WO | 99/28244 | * | 6/1999 |

\* cited by examiner

*Primary Examiner*—Christopher Upton
(74) *Attorney, Agent, or Firm*—Chernoff Vilhauer McClung & Stenzel, LLP

(57) ABSTRACT

A wastewater treatment system comprises a septic tank which flows liquid effluent through an aerobic filter. The aerobic filter has a textile filter media. In one aspect, the textile filter media has relatively high open area and relatively low or moderate water holding capacity. In another aspect, the filter media comprises a plurality of vertically oriented textile sheets having a relatively small gap between adjacent sheets.

28 Claims, 4 Drawing Sheets

WASTEWATER TREATMENT SYSTEM UTILIZING TEXTILE FILTER MEDIA

BACKGROUND OF THE INVENTION

The present invention is directed to a sewage wastewater treatment system comprising a septic tank and aerobic filter, and in particular to an aerobic filter that utilizes a textile filter media.

A septic tank typically provides primary treatment for domestic wastewater. In a conventionally operated septic tank, raw untreated sewage wastewater having a significant concentration of waste solids is introduced into the tank from an adjacent building. In the septic tank, solids separate from the liquid portion of the sewage. Solids having a lower density than the liquid move to the top of the liquid to form a scum layer, and solids having a higher density than the liquid sink to the bottom of the tank to form a sludge layer, resulting in a relatively clear liquid layer between the scum and the sludge. This liquid portion of the wastewater, which exits the discharge end of the tank by means of gravity, a pump, or a siphon, is the septic tank effluent.

The quality of the septic tank effluent primarily determines its subsequent disposition, including the size and kind of any required secondary waste treatment facilities. Such effluent quality is generally measured by the biochemical oxygen demand (BOD), total suspended solids (TSS), and total nitrogen present in the effluent.

Nitrogen in raw untreated wastewater is primarily organic nitrogen combined in proteinaceous material and urea. Decomposition of the organic material by bacteria present in the anaerobic environment of the septic tank changes the organic nitrogen to ammonia nitrogen. Thus, in conventionally treated septic tank effluent, nitrogen is present primarily as ammonia nitrogen.

Secondary treatment of septic tank effluent is typically an aerobic treatment. In addition to its reduction of BOD and TSS, the aerobic environment of secondary treatment causes microorganisms (bacteria) to oxidize ammonia nitrogen to nitrate nitrogen, a process known as nitrification. Thus, in a conventional system, nitrogen in the secondary treatment effluent is primarily nitrate nitrogen. The secondary treatment effluent is either discharged directly from the system, or undergoes at least partial recirculation through a recirculation tank as shown in U.S. Pat. No. 5,480,561.

Several different types of aerobic filters, having different filter media and configurations, have been utilized to provide the secondary treatment. A conventional aerobic filter is disclosed in Ball et al., U.S. Pat. No. 5,531,894. Ball et al. describe the filter media as either coarse sand, or synthetic media of, for example, PVC corrugated sheets or lengths of pipe, or randomly packed pieces of polymeric material. The filter media provides a support for the microorganisms to form a fixed film biological growth.

It has been desired to use textile material for the filter medium in the aerobic filter. Textile sheets provide a potential advantage over sand since they are much lighter and provide more surface area for treatment. Thus, secondary filters which use textile material have the potential advantage of smaller, lighter weight secondary filters.

Hall, U.S. Pat. No. 3,301,401, discloses an aerobic filter comprised of a plurality of hanging sheets. A plurality of deflectors or baffles are positioned adjacent to the upper portions of the sheets. A liquid distributor is positioned above the sheets and delivers a spray onto the deflectors and the sheets.

Yet another prior art aerobic filter utilized hanging textile sheets. The prior art textile sheets were made of polypropylene and had a water holding capacity of 73%, an open area of 85.6% and a surface area of 4,381 ft$^2$/ft$^3$. The characteristics were chosen to mimic the characteristics of sand, which is a conventional filter media. It was believed that the textile filter media should have a maximum surface area and small pores (relatively low open area), since these are characteristics of fine grained sand filter media. In addition, it was thought that the filter media should have a high water holding capacity. It was believed that by increasing the residence time of the water in the filter media (by choosing a relatively high water holding capacity), the filter media would provide improved treatment of the septic tank effluent. The sheets were horizontally spaced apart to provide a gap between adjacent sheets of 5/16ths of an inch.

However, the present inventors found that the prior art textile material having a high surface area (4,331 ft$^2$/ft$^3$), a relatively low open area (85.6%) and high water holding capacity (73%) failed to provide the desired treatment. The aerobic filter did not perform well, as the textile filter media suffered from excessive biological growth and became clogged. The textile sheet also experienced hydraulic sheeting and anoxic conditions. In addition, the hanging sheets were subject to hydraulic load shorts through the gap between the sheets, resulting in poor effluent quality.

What is desired is an aerobic filter that is capable of providing high quality effluent in a relatively small space, and that supports an aerobic environment conducive to biological growth to provide nitrification of the septic tank effluent.

BRIEF SUMMARY OF THE INVENTION

It is one object of the present invention to maximize the quality of septic tank effluent with respect to its ammonia nitrogen levels by providing an aerobic filter having a textile filter media that provides a superior aerobic environment for biological growth in order to provide nitrification.

It is a separate object of the present invention, independent of the previous object, to provide an aerobic filter comprised of a plurality of hanging sheets, in which the spacing between individual sheets is optimized for treatment of effluent.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
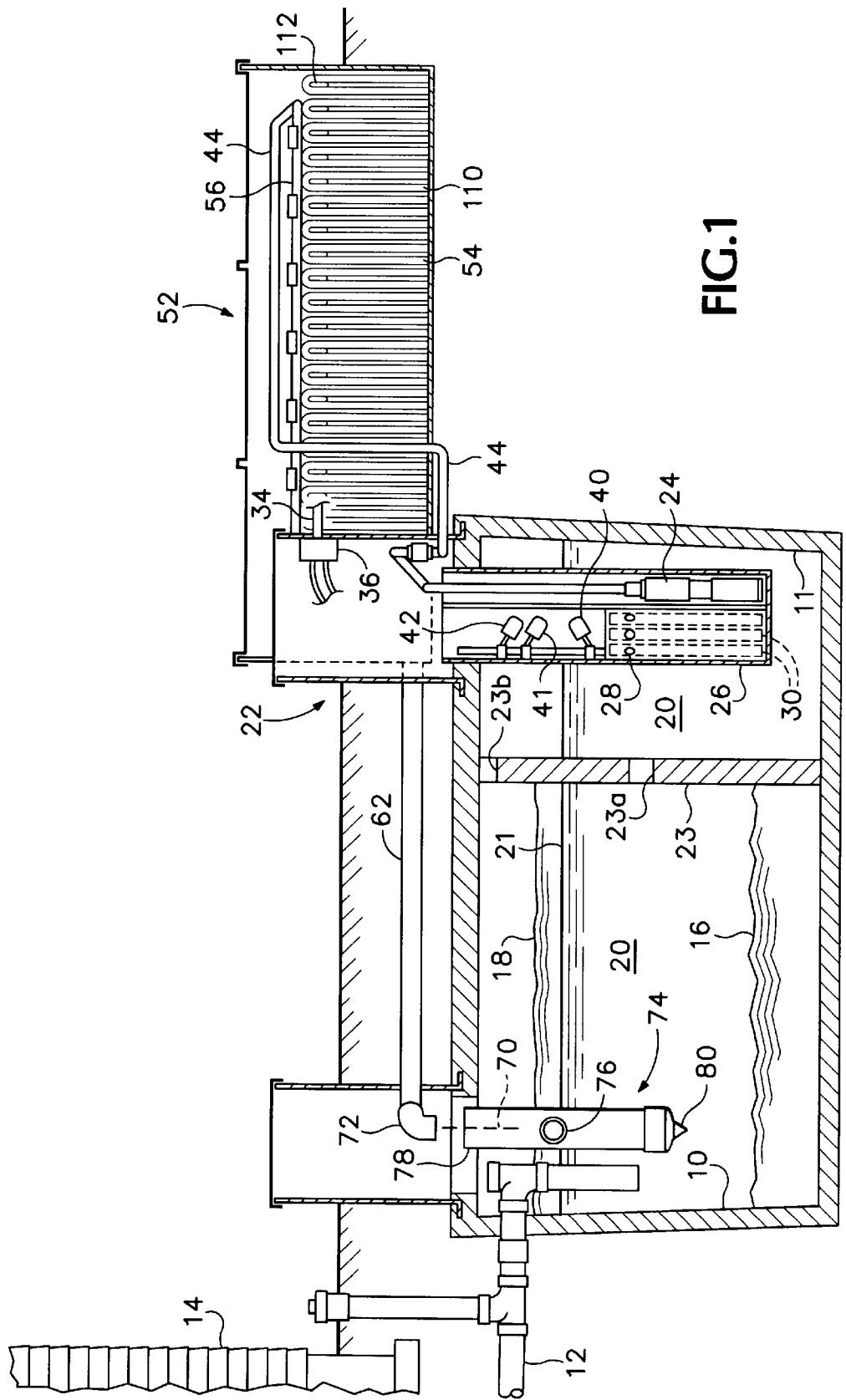
FIG. 1 is a sectional side view of an exemplary embodiment of a system in accordance with the present invention.

In the exemplary embodiment of the invention shown in FIG. 1, a septic tank 10 receives untreated, raw sewage wastewater, having a significant concentration of waste solids, through an inlet 12 directly from a residence or other building 14. The septic tank may be made of a suitable material such as fiberglass or concrete. In the septic tank, gravity operates to divide the wastewater into three layers. The solids separate from the wastewater and distribute into a lower horizontal sludge layer 16 and an upper horizontal scum layer 18 with a relatively clear central horizontal liquid layer 20 therebetween having an upper surface 21. Meanwhile, anaerobic bacteria convert the organic nitrogen in the wastewater to ammonia nitrogen. The liquid layer 20 continually communicates between the septic tank 10 and a recirculation tank 11 through an aperture 23$a$ formed in a dividing partition 23 which also has an air vent 23$b$. Alternatively, the partition 23 could be eliminated so that the entire tank is a combined septic tank and a recirculation tank.

A pump assembly, indicated generally as 22, includes an electric effluent pump 24 preferably located in a cylindrical housing 26 having an encircling horizontal row of apertures 28 exposed to the liquid layer 20. Within the housing 26 is a group of tubular filters 30 which filter solids from the liquid entering the housing 26 through the apertures 28, as described in more detail in U.S. Pat. No. 5,492,635 which is hereby incorporated by reference. Other types of pump assemblies, with or without accompanying housings or filters, could be employed in place of the pump 24 and housing 26. Alternatively, gravity or siphon outlet systems, with or without housings or filters, could be employed.

A control panel (not shown) controls the operation of the effluent pump 24 through an electrical conduit 34 connected to a splice box 36. The pump 24 is activated intermittently in response to a conventional float switch assembly which includes a redundant off/low level alarm float 40, a timer override on/off float 41, and a timer override on/alarm float 42. When activated, the pump 24 pumps the ammonia-laden liquid 20 through a tank outlet 44 to an aerobic filter 52. If desired, the tank outlet 44 can include one or more intervening liquid-containing tank or chambers (not shown).

The aerobic filter 52 is preferably an attached growth treatment system containing a filter media 54, described in more detail below, suitable for the support and growth of an ecosystem of microorganisms, including nitrifying bacteria, capable of performing substantial organic and inorganic process reductions. A distribution manifold 56 receives the liquid 20 from the tank outlet 44 and distributes it through the filter media 54. The filter media 54 is kept in an aerated condition by means of a vent (not shown) so as to support the aerobic microorganisms which degrade or oxidize the organic material present in the liquid and thereby reduce the BOD and TSS. Meanwhile, the nitrifying bacteria convert the ammonia nitrogen present in the liquid to nitrate nitrogen. The liquid passes through the filter media to a filtrate outlet conduit 62 to a filtrate discharge 72 of the septic tank 10.

Figure 2:
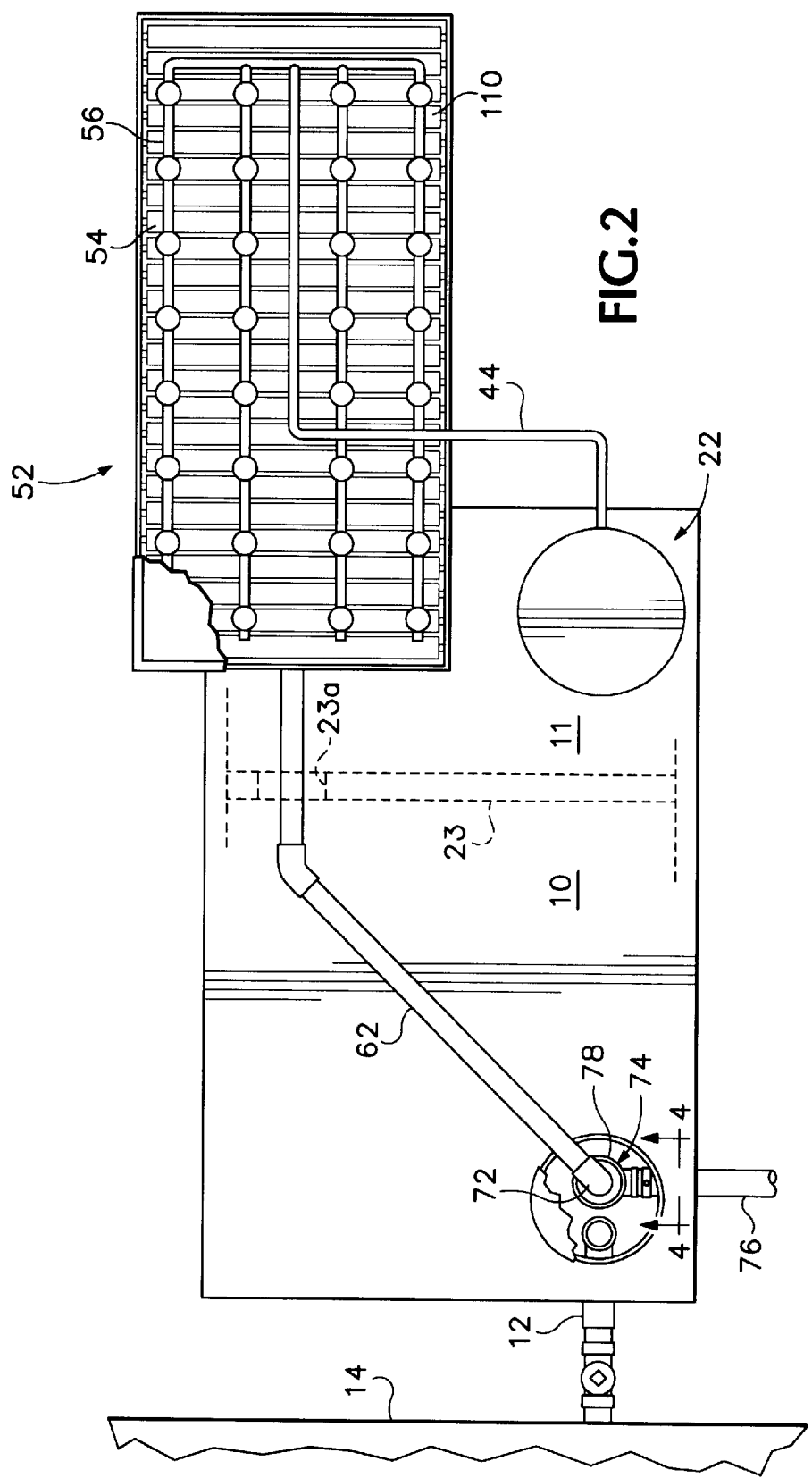
FIG. 2 is a top view of the system of FIG. 1.
Figure 3:
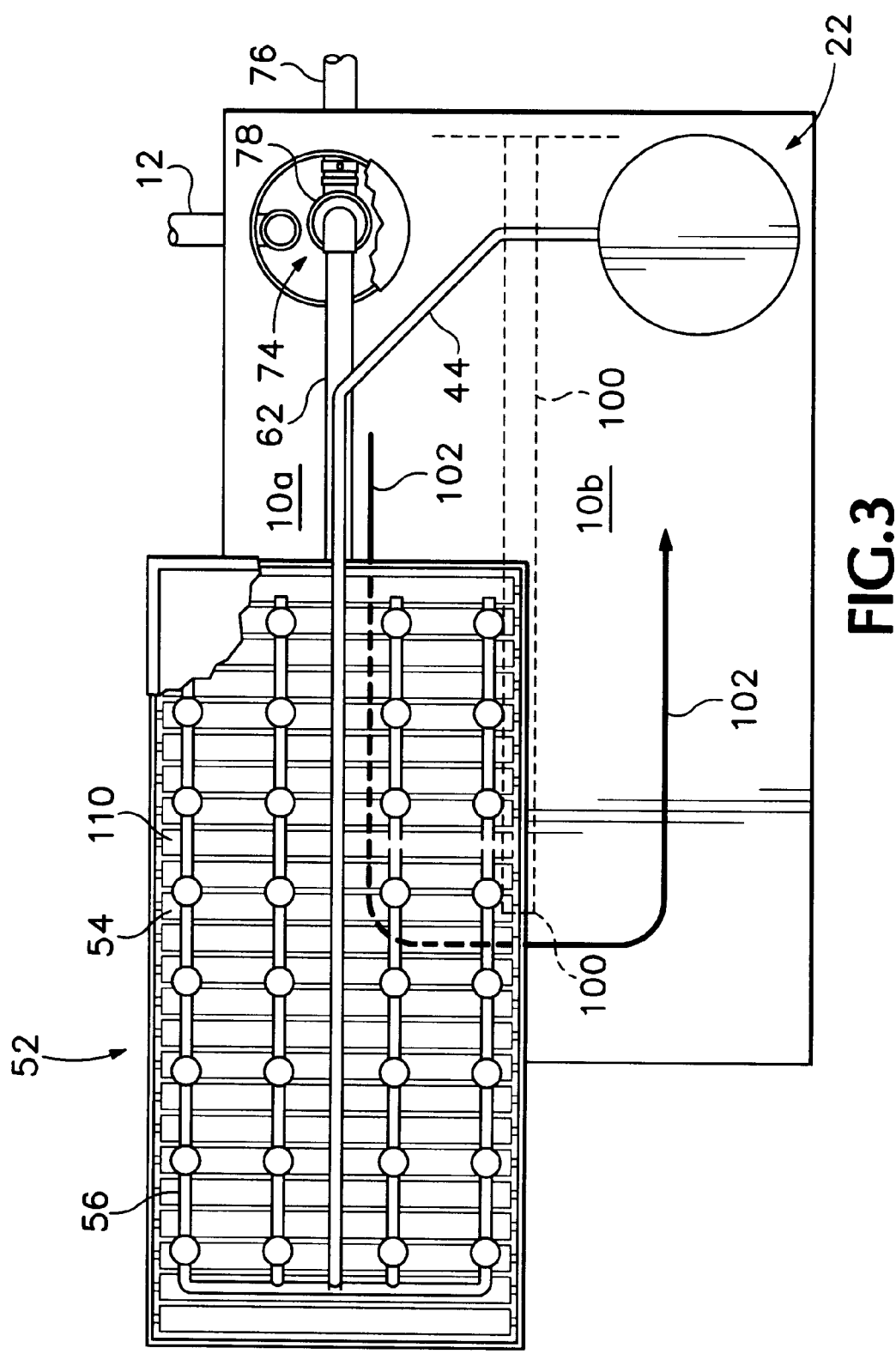
FIG. 3 is a top view of a second exemplary embodiment of a system in accordance with the present invention.

An alternative arrangement of the components of FIGS. 1–2 is shown in FIG. 3, with identical components being labeled identically. In FIG. 3 there is no recirculation tank 11, but rather a septic tank 10$a$ which has a partition 100 only partially extending longitudinally within the tank so that, unlike FIGS. 1–2, all of the contents of the septic tank, including the sludge layer 16 and scum layer 18, exist on both sides of the partition 100. The partition 100 extends above the upper surface 21 of the liquid layer 20 and creates a conventional "meander" flowpath within the tank 10$a$ and 10$b$ indicated by the arrow 102 through which the liquid layer 29 flows sequentially around the opposite sides of the partition 102.

In a first aspect of the invention, the aerobic filter 52 utilizes a filter media 54 which provides a superior support for the aerobic microorganisms which degrade or oxidize the organic material present in the septic tank effluent. The filter media is a textile made from continuous or non-continuous fibers or filaments, held together in either a woven or non-woven configuration. Preferably, the textile material is non-woven. The textile may be of any conventional synthetic fiber, such as polyester, polypropylene, polyethylene, nylon, acrylic, etc. The textile may be formed from a single type of fiber, or from blends.

Figure 4:
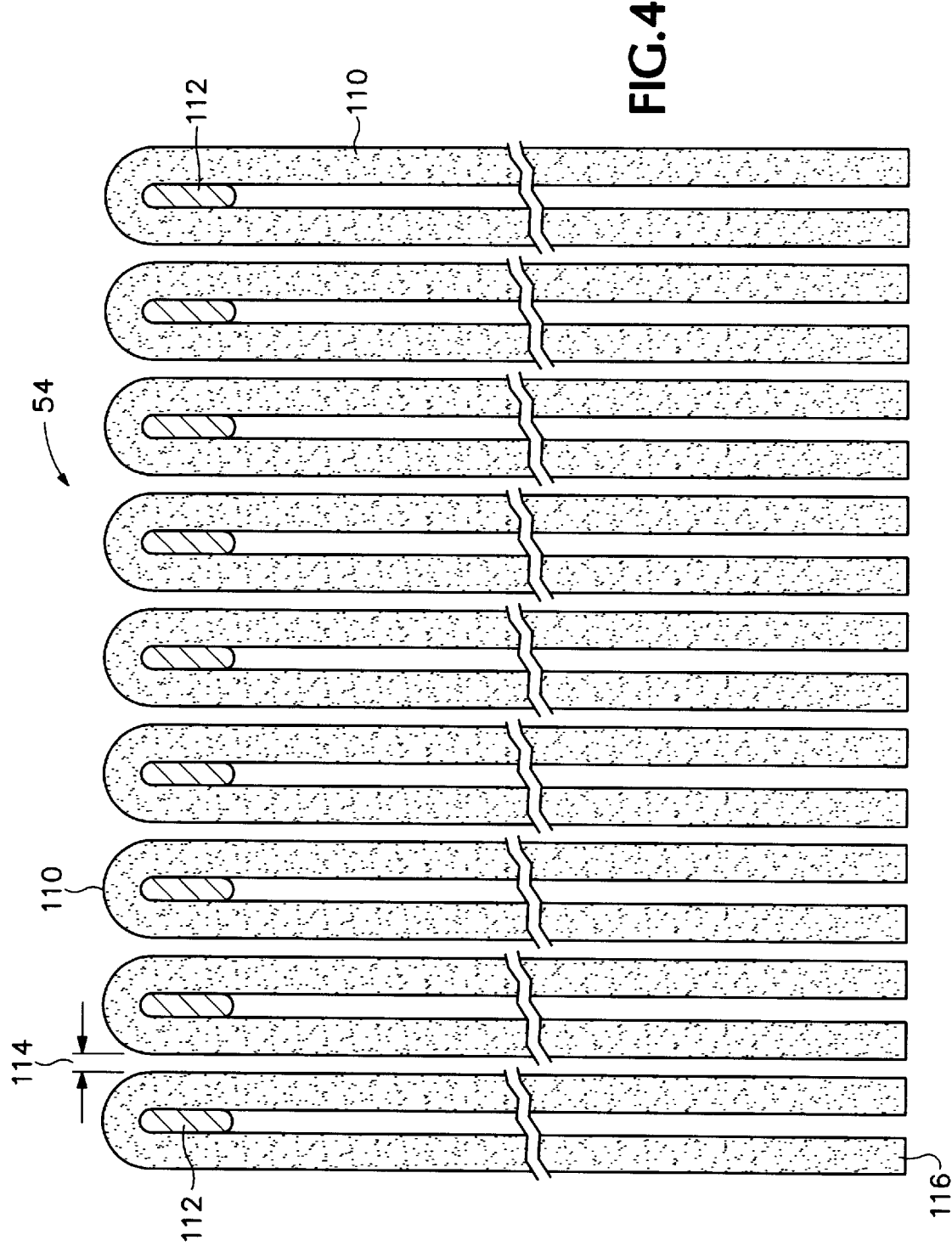
FIG. 4 is a sectional side view of the filter media of the aerobic filter of FIG. 1.

The textile may be either in the form of sheets or chips. Vertically hanging sheets as shown in FIGS. 1 and 4 are preferred, as these provide greater air movement around the filter media, provide more area for the microorganisms, and may be subjected to a higher loading rate. Exemplary textile sheets range from about 0.15" to 0.5" thick when dry.

The textile has several characteristics which improve the functioning of the aerobic filter 52. A first and most important desired characteristic of the textile is that the open area is greater than 86%. The open area is a relative measure of pore size and is the percentage of void volume within the textile material. The open area (OA) may be calculated by measuring the total volume a textile sheet occupies (apparent density) and subtracting the volume the textile sheet would occupy if the sheet were a complete solid. That is, $$OA = \left[1 - \left(\frac{\text{apparent density}}{\text{fiber density}}\right)\right](100)$$

The open area is preferably greater than 88%, more preferably greater than 90%, and even more preferably greater than 95%.

Second, the textile should have a water holding capacity of less than 73%. The water holding capacity may be determined as follows. A container may be filled with a measured (weight) amount of uncompacted textile. The container is filled with textile so that there are no void spaces between individual sheets. The container is then filled with a measured (weight) amount of water. The textile sample is removed and allowed to drain by gravity for 30 minutes. The water holding capacity (WHC) is the percentage of water remaining within the textile, or $$WHC = \left(\frac{\text{retained weight of water}}{\text{original weight of water}}\right)(100)$$

Preferably, the water holding capacity is less than 50%, more preferably less than 35%, even more preferably less than 25%, and most preferably less than 15%.

A third desirable characteristic of the textile is that the surface area is maximized while nevertheless meeting the criteria for open area and water holding capacity. In general, for a given fiber size, as the surface area increases, the open area decreases and the water holding capacity increases. The surface area, (SA) is found by calculating the surface area of all the fibers within a given volume of uncompacted textile. The surface area may be determined by $$SA\left(\frac{\text{ft}^2}{\text{ft}^3}\right) = \left[12,980\sqrt{\frac{\text{denier}}{\text{fiber density}}}\right]\left[\frac{\text{apparent density}}{\text{denier}}\right]^*$$

(*The denier is the number of grams per 9,000 meters of textile filament, and fiber density and apparent density are given in pounds per cubic foot.)

The inventors have found, in general, that for textiles having a denier of 6 or greater the surface area should be less than 4300 ft²/ft³ in order to meet the open area and water holding capacity criteria described above.

Surprisingly, the present inventors have found that these textile characteristics provide for improved support for the microorganisms which oxidize the organic material present in the effluent during secondary treatment. Contrary to the conventional wisdom, the inventors have found that to improve the secondary treatment, the open area of the textile should be increased and the water holding capacity should be decreased. The conventional wisdom held that surface area should be maximized, but this leads to undesirably low open area and undesirably high water holding capacity. While it is desired to maximize the surface area, the amount of surface area must be balanced against the open area and water holding capacity.

In addition, the conventional wisdom held that the open area should be relatively low to achieve good treatment performance since sand provides a very small pore size. However, the inventors have found that for textiles, a larger open area allows significantly higher loading rates, while still providing good treatment performance. The larger open area also provides a greater capacity for solids accumulation within the media and prevents surface clogging.

With respect to the water holding capacity, the present inventors have also found that reducing the water holding capacity improves the aerobic filter 52. Without wishing to be bound by a particular theory, it is believed that if the water holding capacity is too high, water entering the aerobic filter 52 does not replace the water already within the filter media 54. The present inventors found for the prior art textile, that the septic tank effluent introduced into the aerobic filter flowed over the outside of the filter media (hydraulic sheeting) instead of moving through the filter media for treatment. Reducing the water holding capacity allowed the septic tank effluent sprayed onto the filter media to enter the filter media and be treated. Thus, treatment was improved even though the residence time was decreased. The present inventors also believe that a high water holding capacity contributes to an anoxic condition which is not suitable for the aerobic environment needed for secondary treatment. Decreasing the water holding capacity thus also contributes to an improved aerobic environment.

Table 1 lists a variety of textile materials suitable for use as the filter media 54 of the present invention. The present inventors have found that textile Nos. 3 to 7 performed satisfactorily, while textile Nos. 1 and 2 are preferred.

larly in cross-section in FIG. 4. The textile sheets 110 are supported by a plurality of fiber glass rods 112. These are disposed beneath the distribution manifolds 56 and across the aerobic filter 52. As shown in FIG. 4, each rod 112 supports a textile sheet 110 which hangs on either side of the rod 102. Adjacent sheets 110 are horizontally spaced apart to provide a gap 114 between the adjacent sheets 112. However, other support configurations for the vertically oriented sheets are possible, such as hanging a single layer of a textile sheet directly beneath the rod, or providing a vertical support frame instead of rods.

The present inventors have found that the width of the gap 114 between the textile sheets is another factor that greatly influences effluent quality. The inventors have found that the sheets should be spaced close enough together so that substantially all of the effluent discharged from the distribution manifolds 56 passes through the textile sheets. In the prior art, the gap between sheets was about 5/16ths of an inch. This allowed some of the effluent discharged from the manifolds 56 to pass completely through the gaps between adjacent sheets (hydraulic shorting), thus bypassing treatment. However, if the gap 114 between adjacent sheets is too narrow, air movement is reduced within the aerobic filter, and biological growth may bridge between adjacent textile sheets and result in clogging.

Accordingly, the gap 114 between adjacent textile sheets of the present invention should be narrow enough so that short-circuiting is not significant. Thus, substantially all of the effluent discharged through the manifolds passes through the textile sheets. Preferably less than 5%, and more preferably less than 1% of the effluent bypasses the textile sheets. However, it is nevertheless necessary to provide a gap between adjacent sheets to allow air flow for a good aerobic environment.

The optimum width of the gap 114 between adjacent textile sheets may be determined as follows. First, the rods 112 for the textile sheets 110 are installed and the textile sheets 110 are hung vertically from the rods. Septic tank effluent is then discharged through the distribution manifolds onto the textile sheets 110. The bottom ends 116 of the textile sheets are then observed to determine whether substantially all of the effluent is passing through the textile sheets. If it appears that effluent is passing through the gap 114 between textile sheets, so that not all of the effluent is passing through the bottom ends 116 of the textile sheets 110, then the textile sheets are moved closer together to

TABLE 1

| No. | Material | Surface Area (sq. ft./ cu. ft.) | Open Area | Water Holding Capacity | Apparent Density (lb/ cu. ft.) | Fiber Density (lb/ cu. ft.) | Fiber No. 1 Denier | Fiber No. 1 wt % | Fiber No. 2 Denier | Fiber No. 2 wt % | Nominal Weight (oz/yd) | Nominal Thickness (in) |
|---|---|---|---|---|---|---|---|---|---|---|---|---|
| 1 | Polyester | 1442 | 95.4% | 22.1% | 4.0 | 86.4 | 15 | 100% | — | — | 12 | 0.25 |
| 2 | Polyester | 1399 | 95.8% | 11.1% | 3.7 | 86.4 | 15 | 90% | 6 | 10% | 11 | 0.25 |
| 3 | Polyester | 1652 | 95.4% | 13.2% | 4.0 | 86.4 | 15 | 75% | 6 | 25% | 12 | 0.25 |
| 4 | Polyester | 1844 | 94.4% | 32.6% | 4.8 | 86.4 | 15 | 90% | 6 | 10% | 14.5 | 0.25 |
| 5 | Polyester | 3421 | 93.1% | 31.8% | 6.0 | 86.4 | 6 | 100% | — | — | 18 | 0.25 |
| 6 | Nylon | 2842 | 91.7% | 19.4% | 5.9 | 70.848 | 15 | 100% | — | — | 12 | 0.17 |
| 7 | Polypropylene | 4032 | 88.9% | 42.2% | 6.1 | 55.296 | 7 | 100% | — | — | 11 | 0.15 |

In a second separate aspect of the invention, the filter media 54 is provided in the form of hanging textile vertical sheets and the spacing between the textile sheets is optimized. The filter media 54 is comprised of a plurality of vertically oriented textile sheets 110, shown more particudecrease the width of the gap 114. However, the textile sheets 110 are preferably kept far enough apart so as to allow air to move between adjacent sheets, and so as to prevent bridging of biological growth between respective sheets. Preferably, the width of the gap 114 between textile sheets is 0.25 inches or less, and more preferably is about 0.125 inches. Decreasing the width between adjacent sheets provides a further advantage by allowing more filter media to be installed in the aerobic filter for a given aerobic filter volume.

In one embodiment, a portion of the filtrate from the aerobic filter 52 may be returned to the septic tank from the filtrate discharge 72. In the septic tank, heterotrophic bacteria under anoxic conditions convert the nitrate nitrogen in the filtrate to gaseous nitrogen products (a process called denitrification) which permanently separate from the blended filtrate and raw wastewater and are released to the atmosphere. As shown in FIGS. 1–2, a filtrate flow splitter or proportioning valve, indicated generally as 74, receives the filtrate from the filtrate discharge 72 and splits it into a first portion which is returned to the septic tank 10 or recirculation tank 11 for denitrification, and a second portion which is permanently discharged from the treatment assembly through a filtrate discharge conduit 76. The second portion can be discharged to a drain field or to any desired further treatment facility. Operation of the selective return of filtrate to the septic tank is described in more detail in commonly assigned pending U.S. patent application Ser. No. 09/520,126, the relevant portion of which is herein incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A treatment assembly for treating sewage wastewater effluent, comprising:
    (a) an aerobic filter having a plurality of water-permeable, vertically oriented textile sheets, an effluent inlet, a spray mechanism connected to said inlet and located proximate a top of said textile sheets, and a filtrate outlet;
    (b) each of said vertically oriented textile sheets having a respective vertically oriented opposing sheet horizontally spaced apart therefrom defining one of a plurality of vertically oriented gaps separating each of the textile sheets from the respective opposing sheet, each said textile sheet and opposing sheet being horizontally spaced sufficiently close together at a respective one of said gaps to cause flow of said effluent from said spray mechanism primarily into each of said textile sheets and downward within each of said textile sheets rather than downward through said gaps.

2. The treatment assembly of claim 1 wherein each of said textile sheets has a thickness of at least about 0.15 inch.

3. The treatment assembly of claim 1 wherein each of said textile sheets has a thickness, and each of said gaps has a width, said thickness being greater than said width.

4. The treatment assembly of claim 1 wherein said textile sheets have an open area greater than 86%.

5. The treatment assembly of claim 1 wherein said textile sheets have an open area greater than 88%.

6. The treatment assembly of claim 1 wherein said textile sheets have an open area greater than 90%.

7. The treatment assembly of claim 1 wherein said textile sheets have an open area greater than 95%.

8. The treatment assembly of claim 1 wherein said textile sheets have a water holding capacity of less than 73%.

9. The treatment assembly of claim 1 wherein said textile sheets have a water holding capacity of less than 50%.

10. The treatment assembly of claim 1 wherein said textile sheets have a water holding capacity of less than 25%.

11. The treatment assembly of claim 1 wherein said textile sheets have a water holding capacity of less than 15%.

12. The treatment assembly of claim 1 wherein said textile sheets have a surface area of less than 4300 $ft^2/ft^3$.

13. The treatment assembly of claim 1 wherein said textile sheets have a surface area of at least 1399 $ft^2/ft^3$.

14. A method for treating sewage wastewater effluent, comprising:
    (a) providing an aerobic filter for treating said effluent, said aerobic filter having a plurality of water-permeable, vertically oriented textile sheets;
    (b) horizontally spacing each of said plurality of vertically oriented textile sheets apart from one another so as to define respective vertically oriented gaps between respective pairs of adjacent textile sheets; and
    (c) conducting said effluent primarily into said vertically oriented sheets and downwardly within each of said sheets rather than downwardly through said gaps.

15. The method of claim 14 including conducting at least 95% of said effluent downwardly within said vertically oriented textile sheets.

16. The method of claim 14 including conducting at least 99% of said effluent downwardly within said vertically oriented textile sheets.

17. The method of claim 14 wherein each of said textile sheets has a thickness of at least about 0.15 inch.

18. The method of claim 14 wherein each of said textile sheets has a thickness, and each of said gaps has a width, said thickness being greater than said width.

19. The method of claim 14 wherein said textile sheets have an open area greater than 86%.

20. The method of claim 14 wherein said textile sheets have an open area greater than 88%.

21. The method of claim 14 wherein said textile sheets have an open area greater than 90%.

22. The method of claim 14 wherein said textile sheets have an open area greater than 95%.

23. The method of claim 14 wherein said textile sheets have a water holding capacity of less than 73%.

24. The method of claim 14 wherein said textile sheets have a water holding capacity of less than 50%.

25. The method of claim 14 wherein said textile sheets have a water holding capacity of less than 25%.

26. The method of claim 14 wherein said textile sheets have a water holding capacity of less than 15%.

27. The method of claim 14 wherein said textile sheets have a surface area of less than 4300 $ft^2/ft^3$.

28. The method of claim 14 wherein said textile sheets have a surface area of at least 1399 $ft^2/ft^3$.

* * * * *